UNITED STATES PATENT OFFICE.

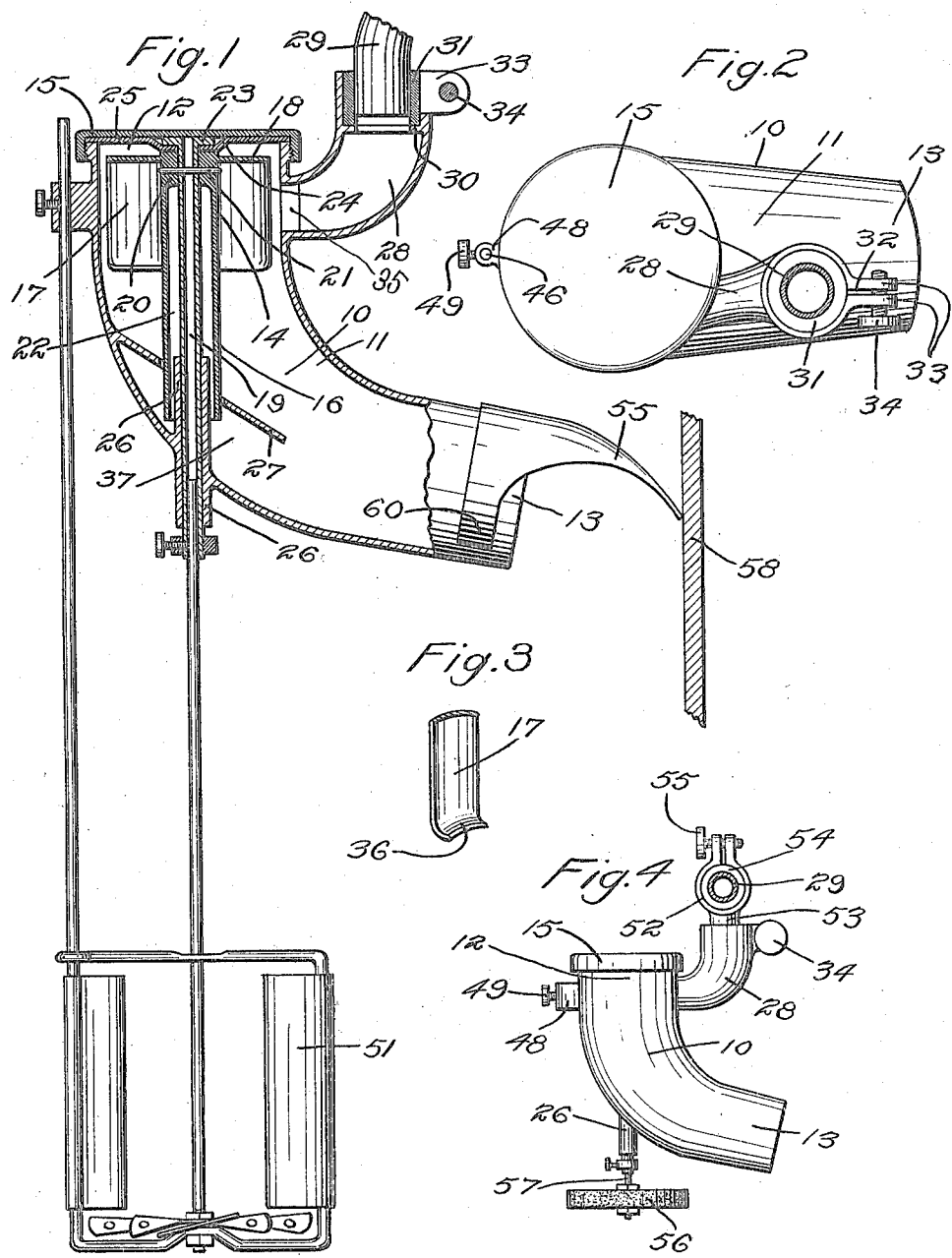

ARTHUR W. JOHNSON, OF MINNEAPOLIS, MINNESOTA, ASSIGNOR OF ONE-FIFTH TO JOHN G. ERICKSON AND ONE-FIFTH TO GEO. F. JOHNSON, BOTH OF MINNEAPOLIS, MINNESOTA.

WATER-MOTOR.

1,270,951.      Specification of Letters Patent.      Patented July 2, 1918.

Application filed November 29, 1915. Serial No. 63,950.

*To all whom it may concern:*

Be it known that I, ARTHUR W. JOHNSON, a citizen of the United States, residing at Minneapolis, in the county of Hennepin and State of Minnesota, have invented certain new and useful Improvements in Water-Motors, of which the following is a specification.

My invention relates to water motors for power-driven egg beaters and has for its object to provide a water motor attachable to a water faucet having connected therewith an egg beater which can be raised or lowered relative to said motor, or which can be entirely removed from the motor when it is desired to use the motor for other purposes. A further object is to provide the drive shaft of the motor with a water-tight bearing comprising overlapping sleeves and a water table for preventing the water from leaking into the mixing receptacle. Another object is to provide the motor with an elbow connecting it to the faucet so that the shaft of the motor may be adjusted to take any desired angular position when the motor is used for different purposes.

The full objects and advantages of my invention will appear in connection with the detailed description thereof and are particularly pointed out in the claims.

In the drawings, illustrating the application of my invention in one form,—

Figure 1 is is an elevational view of my invention showing the water motor in section and having the egg beater attached thereto. Fig. 2 is a plan view of the motor shown in Fig. 1. Fig. 3 is a perspective view of one of the blades of the motor. Fig. 4 is a plan view of the motor used to drive a grinding wheel with the shaft of the same in a horizontal plane.

My improved form of water motor is best shown in Fig. 1. A tubular housing 10 is bent at its center 11 and is open at both ends 12 and 13. As shown in Fig. 1, the end 12 extends vertically upward and incloses a water wheel 14 and is covered by a cap 15 screwable thereon. The water wheel 14, which is shown as cast in one piece but which may be made of several pieces and assembled, comprises a long sleeve 16 from which issue blades 17, being secured at their tops by a plate 18. Sleeve 16 is secured to a tubular shaft 19 at a thickened portion 20 of said sleeve by means of a pin 21 and extends along said shaft, being separated from it by an annular space 22. Shaft 19 is provided at its upper end with a flange 23 which rotates in a socket 24 formed in a plate 25, which plate may be clamped between the cap 15 and the top 12 and so provides a bearing for said shaft and restrains it from longitudinal displacement. Shaft 19 is journaled at its other end in a long bearing 26 cast integral with the housing 10 near its middle 11 and extending into the space 22 between the shaft 19 and the sleeve 16. The sleeve 16, as noted in Fig. 1, extends through a diagonally-positioned downwardly-sloping water table 27, in a manner to be presently explained, and prevents water from leaking in between the bearing 26 and the shaft 19.

The casing 10 is provided at its upper portion 12 with a neck 28 by which the motor is attached to a water faucet 29 and which delivers the water into the motor proper. At its upper part neck 28 is provided with an inwardly-turned flange 30 on which is seated an annular rubber gasket 31. The neck 28 is further slit at 32 and provided with projecting lugs 33 adjacent said slit, which may be clamped together by a thumb screw 34 to firmly grip the faucet 29 and make a water-tight connection therewith, as clearly shown in Fig. 2. As previously mentioned, neck 28 serves to direct the water into the motor proper, and for this purpose the passageway within the same terminates at 35 into a long narrow vertical slot situated at one side of the casing 10, as best shown in Fig. 2. This directs the water stream against the blades 17 on one side of the water wheel and so causes the same to rotate. As the water enters the side of the wheel 14 and leaves at the bottom, the blades 17 are made of the form illustrated in Fig. 3. The major portion is of a vertical trough-shaped construction, while the extreme lower portion is slightly bent away from the vertical so that some energy is imparted to the wheel as the water leaves the same. As the water descends from the wheel the greater part of it strikes the water table 27 and is deflected to pass directly out through the opening 13. A small amount of water, however, trickles down between the sleeve 16 and the water table 27 into the space 37 below the same. The pressure in this space is, however, less than in the remainder of the motor, due to the small opening between the table 27 and the sleeve 16, and so the water which passes through this opening is not forced up into the annular space 22 to leak out between bearing 26 and the shaft 19 but flows out to join the remainder of the discharge leaving at the opening 13. It will hence be comprehended that a perfectly water-tight bearing is provided without the use of a stuffing-box, thus reducing the frictional losses and increasing the efficiency of the motor.

The discharge water upon leaving the opening 13 of the motor may be made to discharge against the sink back 58 by an attachment shown in Fig. 1. This attachment comprises a curved sloping plate 55 provided with fingers 60 which grip the housing 10 and reaches up to the sink back 58, so that the water is directed against back 58 and flows downward to the sink from said discharge opening without splashing.

My motor may be used with an egg beater 51 as clearly shown in Fig. 1. When it is desired to use my motor for grinding or similar purposes, the arrangement shown in Fig. 4 is adopted. Here an elbow 52, having a portion 53 similar to the faucet 29 and a gasket 54 and thumb screw 55 similar to the neck 28, is inserted into said neck and is attached to the faucet 29, thus permitting the shaft 19 to be placed in any desired plane. For grinding purposes a grinding wheel 56 mounted upon a shaft 57 is employed, shaft 57 being insertible in shaft 19 similar to shaft 38 and similarly secured therein. Other similar attachments may also be used with the motor but are not shown in the drawings.

I claim:

1. In combination with the shaft of a water motor, a bearing for said shaft, and means including a water table for preventing water from leaking through said bearing.

2. In combination with the shaft of a water motor, a bearing for said shaft, a sleeve on said shaft spaced from and extending over said bearing, and a water table extending obliquely across said shaft so that said sleeve passes directly through said water table.

3. In combination with the shaft and discharge opening of a water motor, a bearing for said shaft extending within said opening, a tubular sleeve on said shaft spaced from and extending over said bearing, and a water table extending obliquely across said opening, said sleeve passing directly therethrough.

4. A water motor comprising a casing, a shaft journaled in said casing, an inlet pipe parallel to the shaft extending into the casing, and an elbow secured to said inlet pipe and attached to a faucet for permitting the motor to be positioned with the shaft in a horizontal position.

5. In combination with the faucet and back board of a sink, a water motor attachable to the faucet, and means for directing the discharge against said back board to prevent splashing and cause the same to drain into the sink.

6. In combination with a faucet and back board of a sink, a water motor having a discharge outlet and attachable to said faucet, and a baffle member attachable to said outlet for directing the discharge against said back board to prevent splashing and to cause the same to drain into the sink.

7. A water motor comprising a casing in the shape of an elbow, a water wheel situated in the top of the casing, a shaft for said water wheel extending through the lower bent part of the casing, and a cap attachable to the top of the casing for inclosing the water wheel and permitting the same to be removed or placed within the casing.

8. A water motor comprising a casing in the shape of an elbow, a water wheel situated in the top of the casing, a shaft for said water wheel extending through the lower bent part of the casing, a cap attachable to the top of the casing for inclosing the water wheel, a bearing within the casing attached to said cap for suspending and journaling the upper end of the shaft, and a water-tight bearing in the lower portion of the casing for journaling the lower portion of the shaft.

9. The combination with a faucet, of a motor, and an elbow joint between said faucet and motor, removably attached to the faucet, said elbow joint being constructed and arranged to permit of a rotary adjustment of the motor casing.

In testimony whereof I affix my signature in presence of two witnesses.

ARTHUR W. JOHNSON.

Witnesses:
F. A. WHITELEY,
H. A. BOWMAN.